United States Patent

Hetrick

[15] 3,680,250

[45] Aug. 1, 1972

[54] ENCAPSULATED FISHING LURE

[72] Inventor: Glenn C. Hetrick, 2045 E. Parkway Dr., Altoona, Pa. 16602

[22] Filed: Dec. 3, 1970

[21] Appl. No.: 94,922

[52] U.S. Cl..................43/54.5 R, 43/17.6, 43/41.2, 206/56 AA
[51] Int. Cl. ............................................A01k 97/04
[58] Field of Search.........43/54.5 R, 41, 44.99, 41.2; 206/56 AA, 84

[56] References Cited

UNITED STATES PATENTS

| | | | |
|---|---|---|---|
| 1,544,129 | 6/1925 | Burt | 43/41 |
| 2,081,671 | 5/1937 | Lauer | 43/41 |
| 2,580,414 | 1/1952 | Duffey | 206/56 AA X |
| 2,787,858 | 4/1957 | Best | 43/41 X |
| 2,914,883 | 12/1959 | Kustusch | 43/41.2 |

*Primary Examiner*—Samuel Koren
*Assistant Examiner*—Daniel J. Leach
*Attorney*—Morese, Altman & Oates

[57] ABSTRACT

A soft, resilient fishing lure is folded and packaged within a water-soluble capsule. When the lure is to be used, the capsule is immersed in water, the capsule dissolves and the lure is released unfolding to its full size. The lure may then be attached to a hook in the usual fashion.

5 Claims, 3 Drawing Figures

PATENTED AUG 1 1972 3,680,250

INVENTOR
GLENN C. HETRICK
BY
Morse, Altman & Oates
ATTORNEYS

ENCAPSULATED FISHING LURE

BACKGROUND OF THE INVENTION

1. Field of the Invention

This invention relates generally to fishing accessories and more particularly is directed towards a novelty packaged fishing lure.

2. Description of the Prior Art

Artificial fishing lures have long been available in different sizes, shapes and materials and most fishermen normally equip themselves with a wide selection so that different lures may be tried at different times on the theory that some lures will be more attractive to certain fish than others and the preference will change from time to time.

Normally, the fisherman will have a tackle box for his lures and other accessories, and lures stored in the box often become entangled and tend to mark one another. Also, any new lure usually is in a package that is somewhat difficult to open and the remaining package becomes litter which many fishermen will throw into the water, polluting the area.

It is an object of the present invention to provide a new and improved packaged fishing lure having a novelty effect when opening and which leaves no litter.

SUMMARY OF THE INVENTION

This invention features a packaged fishing lure, comprising a soft, artificial resilient fishing lure in the form of live bait, folded and slightly compacted into a water-soluble transparent capsule. When the capsule is immersed in water, it dissolves and the lure unfolds to its full size ready for use.

DETAILED DESCRIPTION OF THE PREFERRED EMBODIMENT

Figure 1:
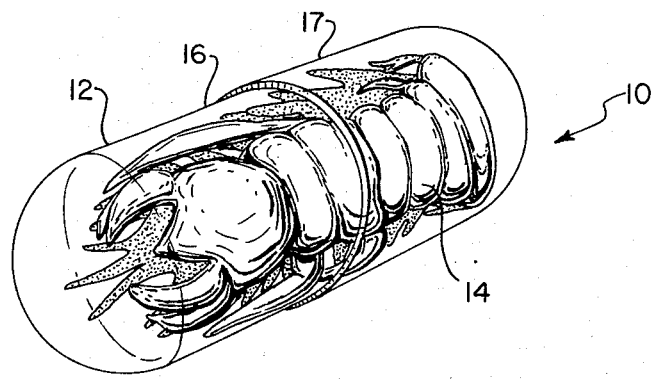
FIG. 1 is a view in perspective of a packaged fishing lure made according to the invention.
Figure 2:
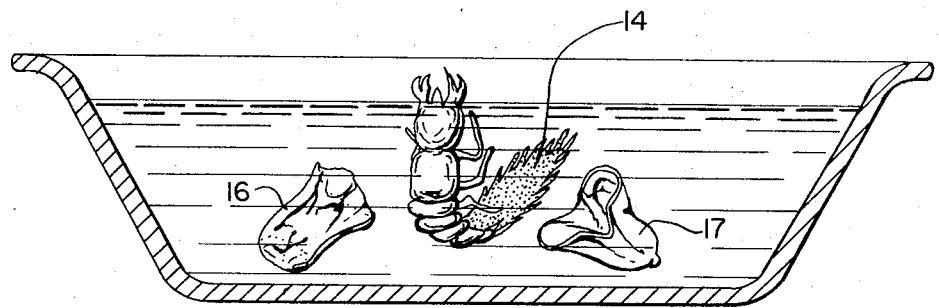
FIG. 2 is a sectional view in side elevation showing the encapsulated lure in the process of being opened within a pan of water, and, FIG. 3 is a view in perspective showing the released lure attached to a hook in typical use.

Referring now to the drawings, reference character 10 generally indicates an encapsulated fishing lure made according to the invention and comprised of a water-soluble capsule 12 containing an artificial lure 14. The capsule 12, in the preferred embodiment is comprised of two cooperating cylindrical sections 16 and 18 which telescope into one another in tightly fitting engagement to enclose the lure 14. The ends of the capsule are seen to be closed so that the lure is fully enclosed and protected. According to the invention, the capsule 12 is fabricated from a transparent water-soluble material, preferably a gelatin-type substance of the sort used in medicinal capsules and typically quite small, although the dimensions are not critical.

The lure 14 within the capsule, in the preferred embodiment, is made from a resilient plastic material such as vinyl and typically is in the form of a live bait such as a hellgrammite, as illustrated, a frog, a crayfish or the like. The lure may be molded in various shapes and encapsulated within the capsule 12. Phosphorescent material may be added so that the lure will glow. In practice, the lure 14 is relatively long and to fit it within the capsule it is folded over in the manner shown when packaging and its extremities pressed inwardly to form a very small, compact package, one which may be easily stored in the fisherman's pocket, hatband or the like.

Figure 3:
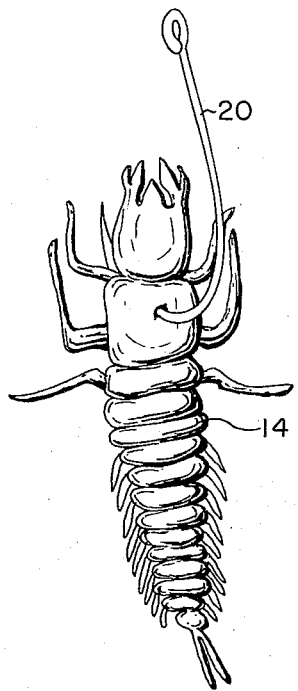

When the fisherman is ready to use the lure, he merely immerses it in water, which would, of course, be available, and this will cause the capsule 12 to dissolve, releasing the lure which will unfold to full size much in the manner of a hatching action. If warm water is available, it will shorten the time for the dissolving action. Since the capsule is dissolved there is no residual litter and the lure may be snagged on a hook 20 as illustrated in FIG. 3.

The packaged lure is so compact that a fisherman may equip himself with a large variety and large number of lures, either in his tackle box or his pocket so that he may try a number of different lures to see which lure will be most attractive to a particular type of a fish on a particular day. The encapsulating arrangement keeps the lures from tangling with one another and also protects them, keeping them fresh until just prior to use. There is no residual litter so that the fishing area will remain clean and uncluttered. The transparent capsule allows the fisherman to select a lure without first opening the capsule.

Having thus described the invention what I claim and desire to obtain by Letters Patent of the United States is:

1. An encapsulated fishing lure, comprising
   a. a water-soluble capsule, and,
   b. a flexible, resilient artificial lure packaged within said capsule.
2. An encapsulated fishing lure according to claim 1 wherein said lure is folded within said capsule.
3. An encapsulated fishing lure according to claim 1 wherein said capsule is transparent.
4. An encapsulated fishing lure according to claim 3 wherein said capsule is fabricated from a gelatin material.
5. An encapsulated fishing lure according to claim 2 wherein the length of said capsule is substantially one-half the length of said lure.

* * * * *